March 26, 1963

L. SHELTON 3,082,804

EGG BREAKING MECHANISM

Filed Feb. 10, 1961

INVENTOR
LEONARD SHELTON

BY Cushman, Darby & Cushman
ATTORNEYS

March 26, 1963 L. SHELTON 3,082,804
EGG BREAKING MECHANISM
Filed Feb. 10, 1961 10 Sheets-Sheet 2
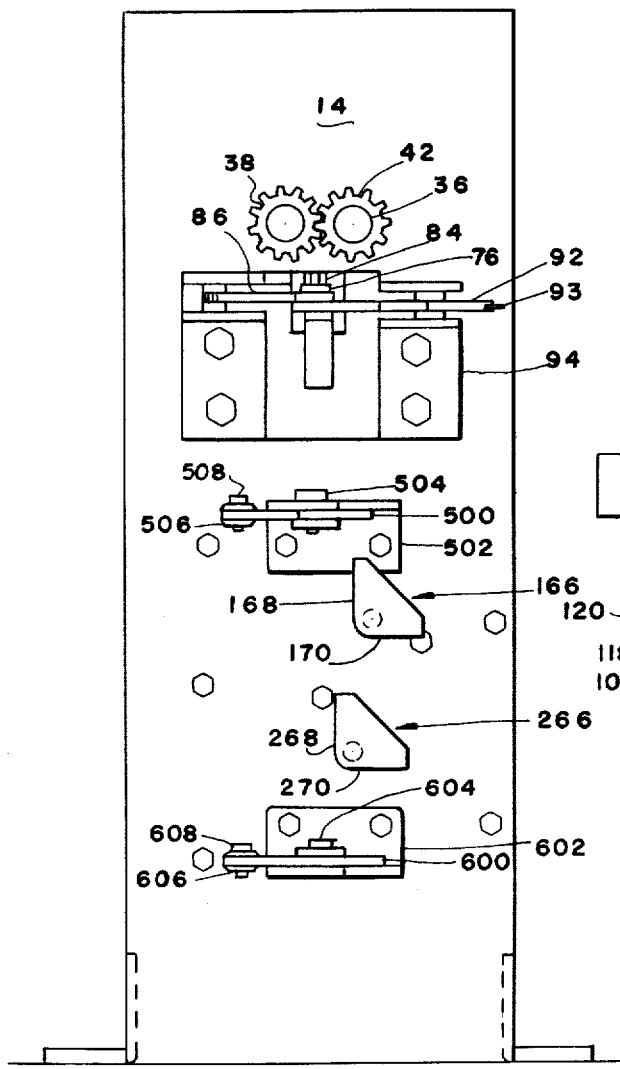
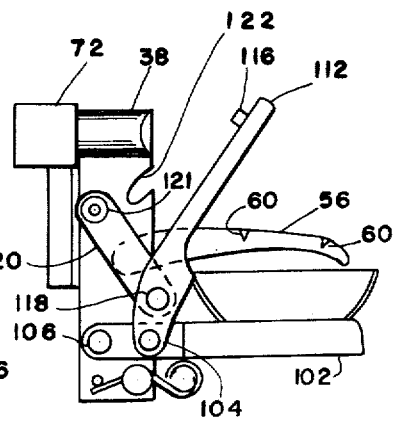
INVENTOR
LEONARD SHELTON
BY Cushman, Darby & Cushman
ATTORNEYS

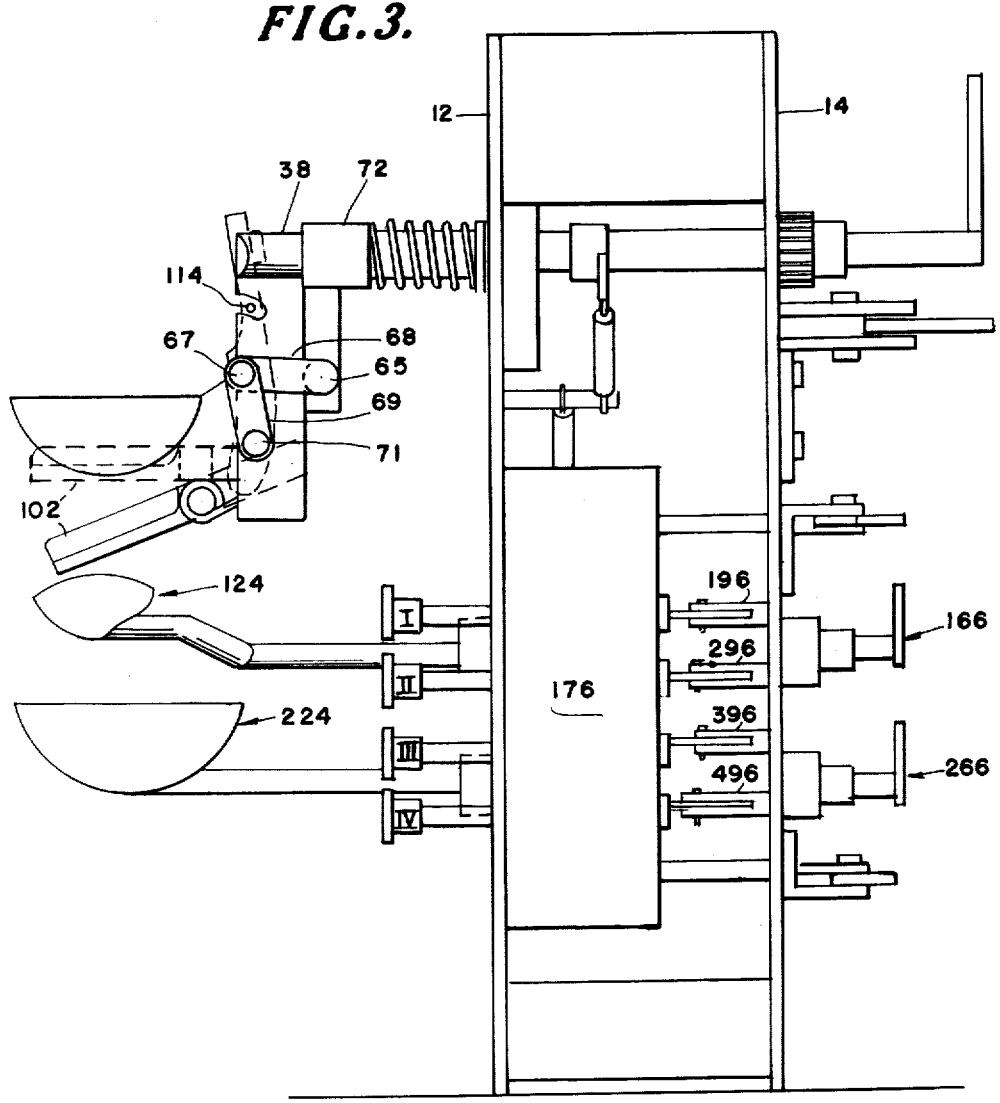

March 26, 1963  L. SHELTON  3,082,804
EGG BREAKING MECHANISM
Filed Feb. 10, 1961  10 Sheets-Sheet 4

INVENTOR
LEONARD SHELTON
BY Cushman, Darby & Cushman
ATTORNEYS

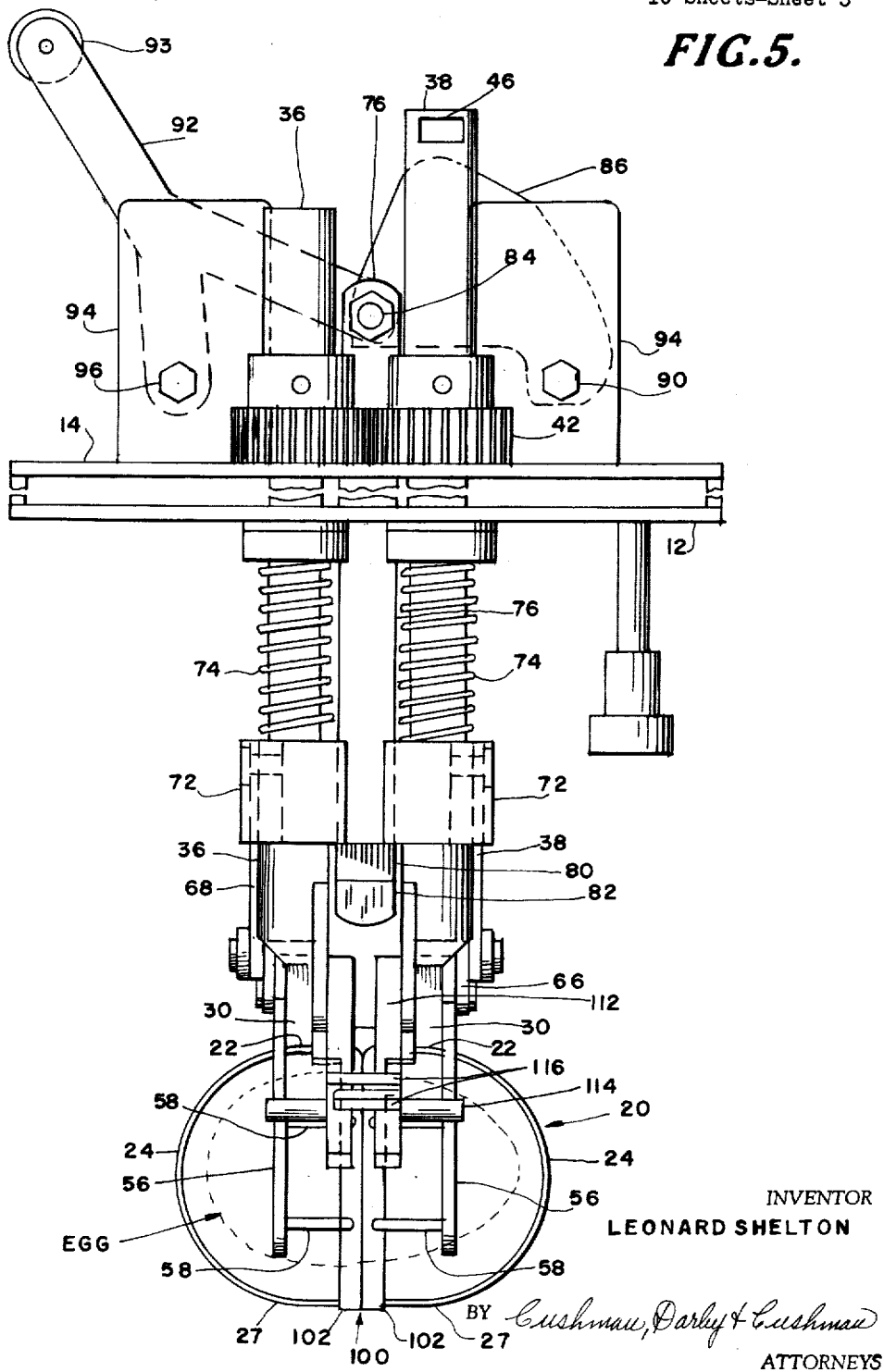

March 26, 1963  L. SHELTON  3,082,804
EGG BREAKING MECHANISM
Filed Feb. 10, 1961  10 Sheets-Sheet 6

INVENTOR
LEONARD SHELTON

BY Cushman, Darby & Cushman
ATTORNEYS

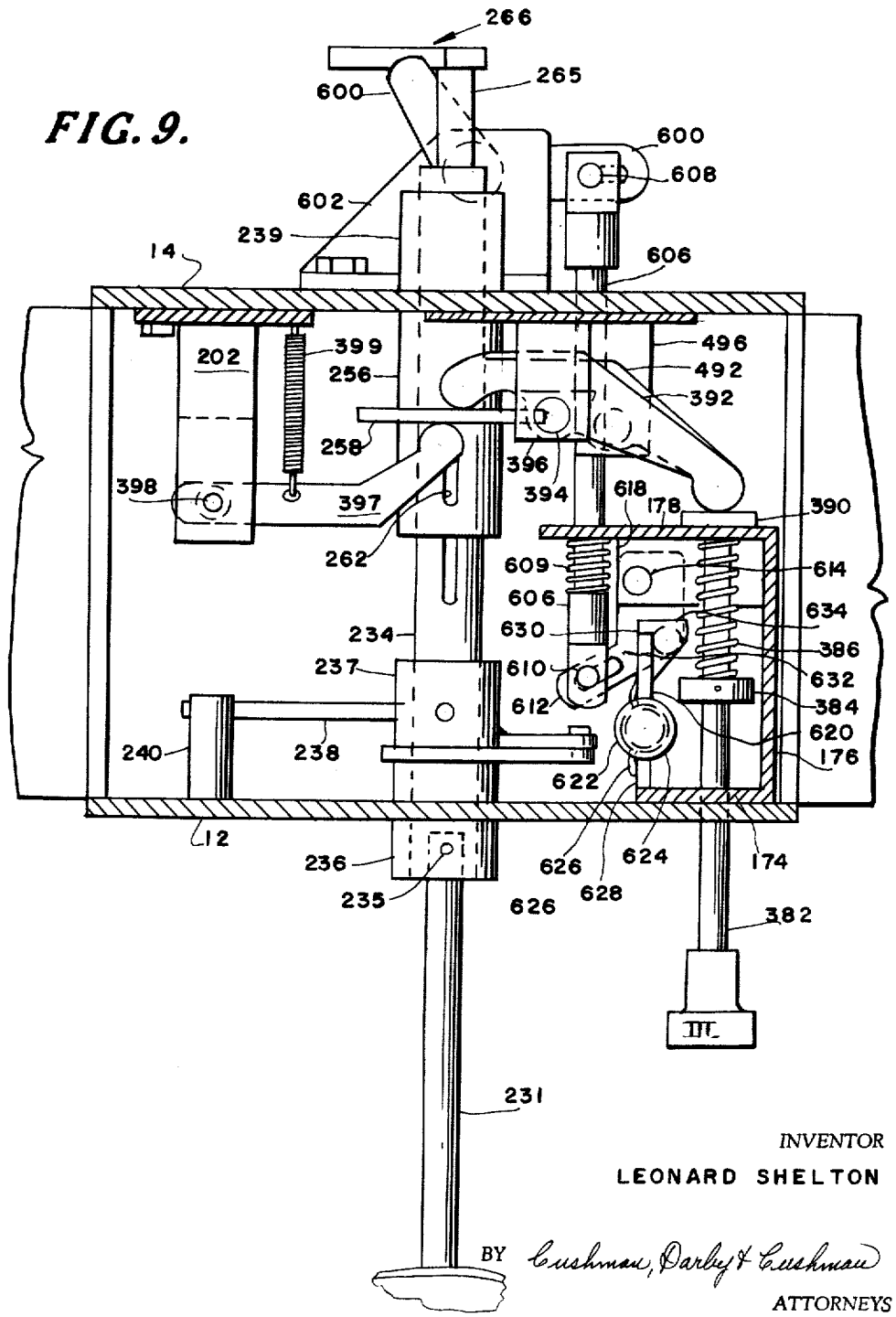

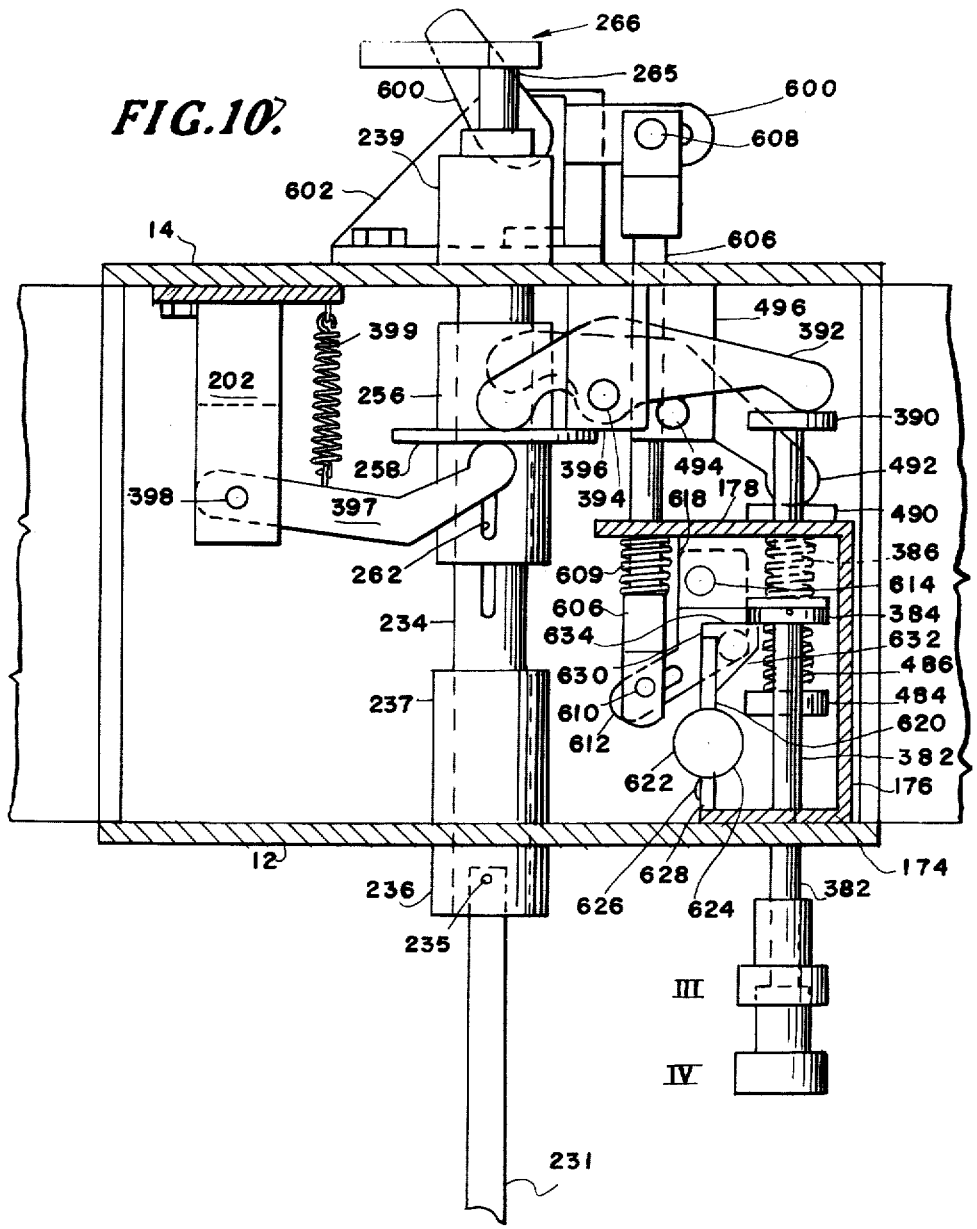

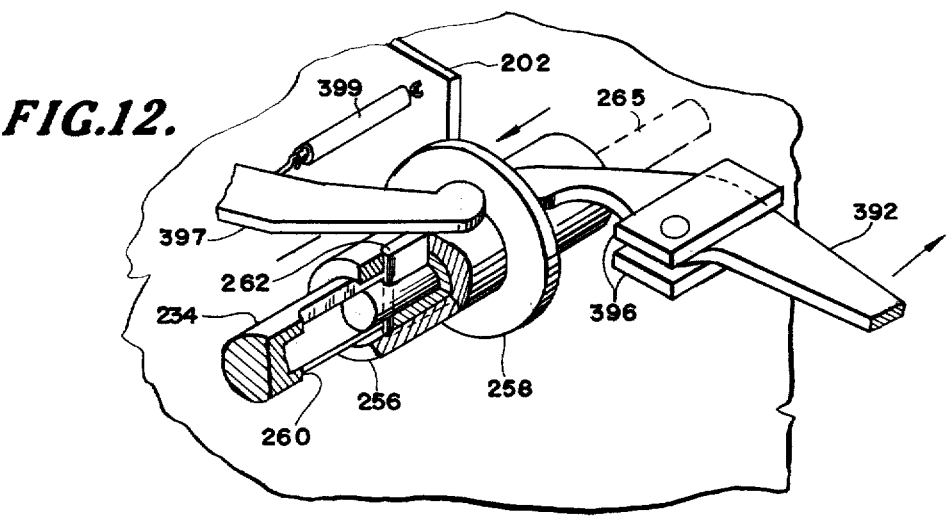
FIG.12.
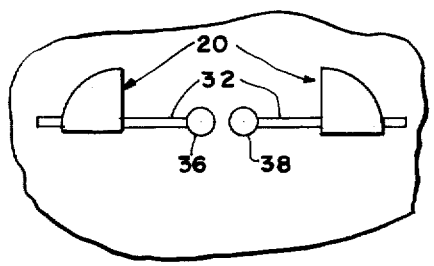
FIG.13.
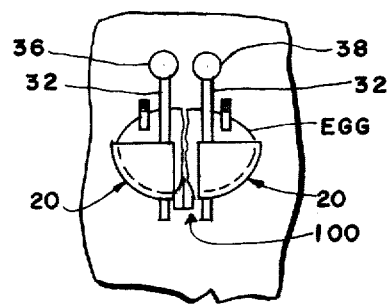
FIG.15.
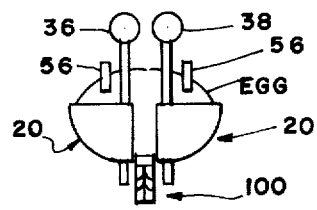
FIG.14.
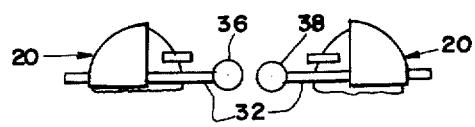
FIG.16.

March 26, 1963  L. SHELTON  3,082,804
EGG BREAKING MECHANISM
Filed Feb. 10, 1961  10 Sheets-Sheet 10

INVENTOR
LEONARD SHELTON
BY Cushman, Darby & Cushman
ATTORNEYS

United States Patent Office 3,082,804
Patented Mar. 26, 1963

3,082,804
EGG BREAKING MECHANISM
Leonard Shelton, 8764 Cedar St., Omaha, Nebr.
Filed Feb. 10, 1961, Ser. No. 88,395
9 Claims. (Cl. 146—2)

This invention relates to an apparatus for breaking eggs and separating the yolks, albumen and empty shells from each other. More in particular it relates to an apparatus for accomplishing these functions which has improved egg holding means, improved egg breaking means and a selector means whereby certain yolks and whites may be collected separately from other yolks and whites.

Machines which automatically break an egg and separate the yolk, albumen and shell from each other are known in the prior art. Known machines for accomplishing these functions basically comprise a clamping means for holding the whole unbroken egg, knife means for breaking the egg shell while being held in the clamping means and various containers located below the clamping means for accepting and separating the contents of the shell. The machine of the invention, while having some features in common with known machines, has many improvements in the egg-holding means, egg-breaking means and the separating means which result in the rapid and efficient processing of large batches of eggs regardless of the range of size, shape and condition of the shell and the quality of the contents.

It is a primary object of this invention to provide an egg-holding means which positively holds an egg against all movement while at the same time exerts no crushing forces on the egg shell.

It is a further object of this invention to provide an egg-holding means which will accept in sequence eggs of different shape, size and shell condition.

It is a further object of this invention to provide an egg-holding and breaking means which efficiently cracks but does not shatter an egg shell.

It is a further object of the invention to provide an egg-breaking and separating machine with selector means which permits an operator to control the dumping cycle so that yolks of like quality are collected separately from whites of like quality.

It is a further object of the invention to provide an egg-breaking machine with selector means as stated and with reset means to cancel operation of the selector means.

It is a further object of this invention to provide an egg breaking and separating machine with a plurality of interchangeable cup means for receiving yolks, whites and whole eggs whereby whole eggs and blends of yolks and whites may be obtained.

It is a further object of this invention to provide an efficient egg-breaking and separating machine in which a single multisurfaced cam sequentially actuates means for holding, breaking and dumping eggs.

*Brief Description of the Invention*

The above objects are attained with the machine to be described hereinafter in detail. First, however, a brief description of the machine and its operation will be given. The primary components—an egg-holding means, a knife means, a yolk-receiving cup and an albumen-receiving cup—are mounted one below the other on a box-like frame consisting of a front plate 12, a rear plate 14, a bottom plate 16 and two short side plates 18. This combination together with the elements within the frame is hereinafter referred to as the breaking head 10.

In the drawings:

FIGURE 2 is a rear elevation of the breaking head of FIGURE 1.

FIGURE 3 is a side elevation of the left side of the breaking head of FIGURE 1.

FIGURE 5 is an enlarged top plan view of the breaking head of FIGURE 1.

FIGURE 8 is an elevation of the right side of the left half of the egg-holding elements in FIGURE 1.

FIGURE 9 is an enlarged horizontal section taken on the line 9—9 of FIGURE 1 and rotated one-quarter turn in a clockwise direction.

FIGURE 10 is the same as FIGURE 9 with some of the parts in different positions.

FIGURE 12 is a perspective view of some of the elements of FIGURE 9.

FIGURES 13–16 are schematic views of some of the egg-holding elements of FIGURE 1 showing the operation of the elements.

Figure 1:
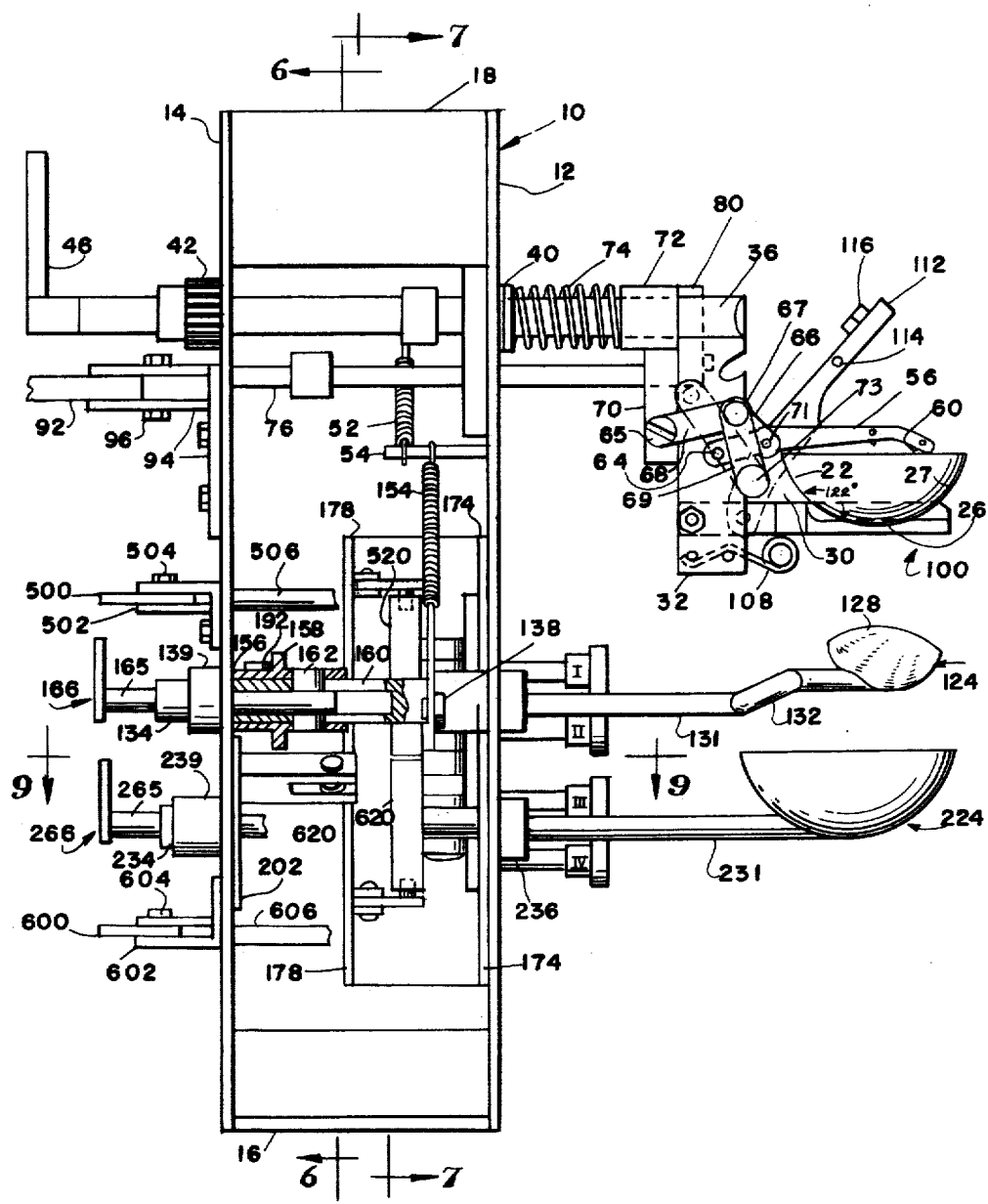
FIGURE 1 is a side elevation partly in section of the right side of the egg-breaking head of the invention.

The egg-holding means of the invention comprises two slightly spaced half-cups 20 with concave surfaces facing each other and upwardly and two pivoted fingers 56 which can be lowered onto the top of an egg in the cavity formed between the half-cups 20. Each half-cup 20 and each finger 56 is attached to the end of one of two horizontal parallel shafts 36 and 38 so that rotation of the shafts in opposite directions will drop the egg contents by swinging the half-cups 20 and fingers 56 away from each other. The knife 100 comprises two half-blades 102 each of which is pivoted immediately below the half-cups. When the shafts are rotated so that the half-cups are adjacent each other, the two half-blades 102 are in contact with each other and form a knife 100 which can be snapped upwardly into the narrow space between the half-cups to crack the shell of an egg. After the shell is cracked by the knife, each shaft is rotated 90° in opposite directions so that the half-cups 20, fingers 56 and half-blades 102 separate and allow the yolk and white to drop by gravity to a yolk cup 124 which is directly below. Each half of the egg shell is held by a finger 56, a half-cup 20 and a half-blade 102 and is released later by movement of the finger 56 away from the half-cup 20. The yolk cup 124 is sized to hold only a yolk so that substantially all of the white either misses the yolk cup entirely or overflows from the yolk cup and drops into an albumen cup 224 which is directly below the yolk cup. The yolk cup 124 is attached to the end of a horizontal shaft 131 which can be rotated 90° so that the yolk can be dumped into a container. The albumen cup 224 is similarly mounted so that the white can be dumped into a different container. The ends of the shafts 36 and 38 opposite the attachment of the half-cups 20 project beyond the rear plate 14 where shaft 38 terminates in a cam surface. Shafts 134 and 234 opposite the attachment of the yolk and albumen cups are provided with extensions 165 and 265 respectively which terminate in cam surfaces beyond rear plate 14. The breaking head 10 is mounted on the periphery of a horizontal rotatable table 704 in such a position that the shafts are horizontal and the cammed ends of shaft 38 and of extensions 165 and 265 on shafts 134 and 234 point toward the center of the table. A vertical stationary cam shaft 716 projects through a center opening in the table and is provided with a variety of horizontally projecting cams and dogs on its vertical surface. As the table 704 carrying the breaking head 10 is turned about the stationary cam shaft 716, the cammed ends of the shaft 38, and of the extensions 165 and 265 on shafts 124 and 224 and other cammed surfaces which project from the breaking head 10 engage the horizontal cams and dogs projecting from the stationary cam shaft 716 and are actuated in a preselected sequence and direction. The breaking head 10 also includes a selector means which permits an operator of the apparatus, after having observed the contents of an egg, to change the sequence of dumping yolks and whites. The operator can, for example, collect inedible yolks or whites separately from perfect yolks or whites. The selector means includes four push buttons (I, II, III and IV) each of which when pressed changes the horizontal position of the extension 165 on the yolk cup shaft or of the extension 265 on the albumen cup shaft. The horizontal position of the extensions determines the moment in the cycle at which the extensions and consequently the shafts 124 and 224 will be rotated by a dog on cam shaft 716, as will be understood from the detailed description to be presented later. The selector means is provided with two reset features. One reset feature permits the operator to cancel the effect of any button previously pressed and the other automatically cancels at the end of each cycle the effect of any button pressed during that cycle.

*Egg Holding Means (FIGURES 1, 4, 5 and 8)*

As shown in FIGURES 1 and 5 each half-cup 20 consists of a rear wall 22, side wall 24, a bottom wall 26 and a front wall 27. When the two half-cups 20 are in the egg-holding position, the concave surfaces of each half-cup face upwardly and toward the concave surfaces of the adjacent half-cup 20 so that an egg-holding cavity is formed. A horizontal section taken through the half-cups, the rear walls, side walls and front walls would form generally an ellipse, and a vertical section through the space between half-cups, the rear wall, bottom wall and front wall would form generally a semi-circle. The rear wall of each half-cup 20 is, however, somewhat flattened and makes an angle of about 122° with the bottom wall. It has been found that this arrangement of bottom and rear walls is particularly advantageous because every egg, regardless of diameter, comes to a position at rest in the cavity which is optimum for the cracking operation by the knife 100. The half-cups 20 are of sufficient size to form a cavity which will readily hold a large egg. The exterior of each rear wall 22 of each half-cup 20 is welded to a horizontal projection 30 which is welded to the front vertical edge of a vertical support plate 32. The top of vertical support plate 32 is welded to the lower surface of the end portion of right horizontal shaft 36. Left horizontal shaft 38 similarly supports the other half-cup 20. Shafts 36 and 38 pass through holes in front plate 12 and rear plate 14 and are held in place by collar 40 and gears 42 which are held to the shafts by set screws. Each gear 42 meshes with the other so that rotation of one shaft results in oposite rotation of the other shaft. The rear end of left shaft 38 terminates in cam 46 which is an upwardly projecting arm rigidly attached to the rear end of left shaft 38. Half-cups 20 can be moved apart by a cam on stationary cam shaft 716 to be described later, which rotates cam 46 90° in a clockwise direction as viewed in FIGURE 2 so that shafts 38 and 36 and the elements attached thereto rotate 90° in opposite directions (FIGURES 13–16). When the stationary cam releases cam 46, the shafts 38 and 36 are returned to their original position by spiral spring 52 attached at one end to a collar on shaft 38 and at the other end to pin 54 mounted on front plate 12.

Figure 4:
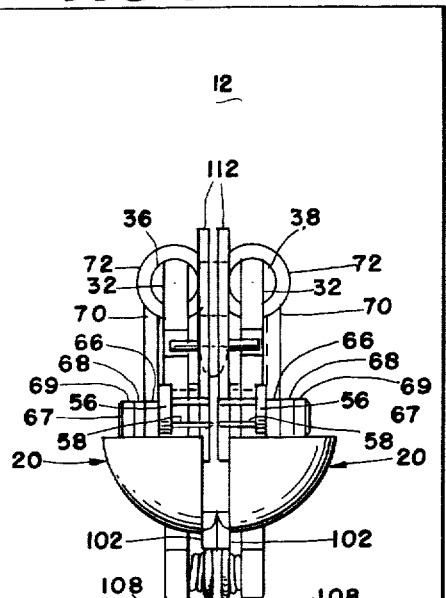
FIGURE 4 is a front elevation of the breaking head of FIGURE 1.

Associated with each half-cup 20 is an egg-holding finger 56 which rotates through an arc about pivot pin 64 which pivotally connects the inner end of finger 56 with vertical support plate 32. Each finger 56 has two spaced lateral projections 58, the free ends of which have downwardly projecting points 60. When fingers 56 are in an up position, an egg can be placed in the cavity between adjacent half-cups 20. When the fingers 56 are lowered, the points 60 come into contact with the upper surface of the egg and hold the egg in position in the cavity. In FIGURES 1, 4 and 8 fingers 56 are in their lowermost position, there being no egg in the cavity. In FIGURE 3, the fingers have been omitted in order that other elements may be more clearly shown. Fingers 56 are caused to pivot about a pivot pin 64 by operation of a cam-operated push rod 76 which actuates links 66, 68 and 69. As shown in FIGURES 1 and 5, a single push rod 76 passes through the breaking head 10. The rear end of push rod 76 is provided with a horizontal slot in which a cock lever 92 and a crack lever 86 are pivoted by a vertical bolt 84. Cock lever 92 is pivotally supported by a bolt 96 on a bracket 94 which is attached to the rear plate 14 of the breaking head 10. The rear end of cock lever 92 is provided with a roller 93 which engages cam A on stationary cam shaft 716. When push rod 76 moves rearwardly as a result of movement of cock lever 92, a vertical projection 80 on the front end of push rod 76 engages the edges of sleeves 72 which are slidable mounted on shafts 36 and 38. Continued rearward movement of push rod 76 moves sleeves 72 rearwardly against spiral springs 74. Rigidly attached to each sleeve 72 is a downwardly projecting fin 70 to which the rear end of link 68 is pivoted by a bolt 65. Link 68 is pinned at its front end to the upper end of link 69 and to the upper end of link 66 by a pin 67. The lower end of link 66 is pivoted to finger 56 forwardly of pin 64 by a pin 71. The lower end of link 69 is pivoted to horizontal projection 30 on support plate 43 by a pin 73. Rearward movement of sleeve 72 and fin 70 by the push rod 76 tends to straighten the linkage formed by links 66 and 68 with the result that the outer end of link 66 moves upwardly in an arc and carries with it finger 56.

The linkage formed by links 66, 68 and 69 performs two critical functions when sleeve 72 and fin 70 are being returned to their at-rest position by spring 74. Firstly, the linkage is so interconnected that a very small percentage of the force exerted by spring 74 is transmitted to finger 56 after push rod 76 releases the sleeve 72. As a result finger 56 contacts an egg shell with practically no crushing force, and the term "resilient" is used herein with such connotation. This function is particularly important when the egg has an unusually thin shell or when the egg shell is unusually fragile as a result of having been slightly cracked during previous handling. It has been found that even eggs which have been cracked to the extent of having albumen leaking from them can be gripped by the fingers without being further cracked. Secondly, the linkage acts as a friction lock which prevents upward movement of finger 56 by any force except that applied by push rod 76. That is, after push rod 76 has been released, finger 56 is free to pivot downwardly but is locked by links 66, 68 and 69 against upward movement. As a result, once a finger 56 engages its points 60 with an egg there is little possibility that the egg will change its position in the cavity formed by half-cups 20.

Since each finger 56 is pivoted independently, the pairs of points 60 engage the top of an egg independently. Thus, each pair of points 60 settle gently and positively into contact with the shell of the egg regardless of the shape or size of the egg. In FIGURE 5 the position of an egg relative to fingers 56 is shown in dotted lines.

Egg Breaking Means (FIGURES 1, 3, 4, 5 and 8)

The egg-breaking knife 100 and associated linkages are shown in FIGURES 1, 4, 5 and 8 in a cocked position. The knife 100 consists of two half-blades 102 each of which is pivoted at its rear end to the inner surface of the support plate 32 by a bolt 106. When the half-cups 20 are in an egg-holding position as shown, for example, in FIGURES 4 and 5, half-blades 102 engage each other along their longitudinal opposed surfaces. The egg-breaking knife 100 thus formed is free to swing into and out of the space between the half-cups 20 under the action of a linkage to be described next.

A cocking arm 112 is pivoted at its lower end to each half-blade 102 by a pin 104 located forwardly of pivot bolt 106. A link 120 is pinned at its lower end to cocking arm 112 by pin 118 and at its upper end to the inner surface of the vertical support plate 32 by a pin 121. Each cocking arm 112 has a laterally and outwardly projecting pin 114 located toward its forward end. When fingers 56 are raised by actuation of cocking lever 92, the top of the fingers engage the lower surfaces of pins 114. Continued upward movement of fingers 56 results in an upward and rearward force on pins 114. Cocking arm 112 is moved by this force so that pins 114 swing into notches 122 in support plates 32 as seen in FIGURE 8. Movement of cocking arm 112 also causes half-blades 102 to pivot downwardly and rearwardly about pivot bolt 106 and against the opposing action of spring 108 also as seen in FIGURE 8. When each pin 114 reaches its position in notch 122 the position of cocking arm 112, link 120 and half-blade 102 is such that these pieces remain in position, hereinafter referred to as the cocked position, when the upward force exerted by fingers 56 is removed.

The egg-breaking movement of knife 100 is initiated by forward movement of push rod 76. A dog B projecting from stationary cam shaft 716 will engage crack lever 86 (FIGURE 5) which is pivoted by a bolt 90 to bracket 94 on the rear plate 14 of the breaking head 10. Pivotal movement of crack lever 86, counterclockwise as viewed in FIGURE 4, results in a forward force on bolt 84 and forward movement of push rod 76. The forward end of push rod 76 terminates in a short horizontal nub 82 on vertical projection 80. As push rod 76 moves forward, nub 82 engages the top pieces 116 on cocking arms 112. One end of each top piece is welded to a different cocking arm 112 and the free end rests on top of the other cocking arm 112. Thus, when nub 82 presses forwardly on top pieces 116, equal forces are exerted on each cocking arm 112 and both arms 112 are given a slight forward movement. This slight movement results in an uncocking of the linkage between cocking arm 112, half-blade 102, link 120 and associated pins so that the spring 108 snaps half-blade 102 into the egg-breaking position shown in FIGURE 1. Since the uncocking movement of both cocking arms 112 is simultaneous, the two half-blades 102 forming knife 100 are snapped simultaneously into the breaking position between the adjacent bottom walls 26 of the half-cups 20.

The snapping of knife 100 into the approximate middle of an egg resting in the half-cups 20 cracks the shell of the egg along its entire small circumference (FIGURE 15). Fingers 56 hold their points 60 in contact with the top of egg and prevent any movement of the egg so that a positive, uniform, non-shell-shattering blow is always delivered by the knife 100 to the egg. The points 60 on fingers 56 continue to grip the shell after cracking, two points 60 engaging each half of the shell and holding it in its associated half-cup 20. As the breaking head 10 moves to the next position around the stationary cam shaft 716, a cam C will cause opposite rotation of shafts 36 and 38 as described above. Each set of half-blades 102, half-cups 20, fingers 56, cocking arms 112 and their associated linkages are thereby caused to separate 180° from the other set (FIGURE 16). Each half of the egg shell remains held in its associated half-cup 20 and the contents of the egg fall freely into the cups below.

Yolk Cup and Shaft (FIGURES 1, 2, 4, 6 and 7)

As seen in FIGURE 1 yolk cup 124 is mounted below half-cups 20 on shaft 131. Shaft 131 is not centered with respect to half-cups 20, but an off-set portion 132 of the shaft places yolk cup 124 directly below the half-cups. Yolk cup 124 has generally the shape of a hemisphere. However, the right side 128 of the cup is higher than the left side to aid in accurately catching the yolk and to give a smooth, clean separation of the yolk from the white. The volume of the yolk cup is about that of an egg yolk so that substantially all of the white either misses the yolk cup entirely or slips past the rim of the yolk cup and drips into the albumen cup 224 below.

The yolk cup shaft 131 and associated elements 134–170 are substantially the same as corresponding albumen cup shaft 231 and associated elements 234–270 which are next described.

Albumen Cup and Shaft (FIGURES 1, 2, 4, 6, 7, 9, 10 and 12)

Albumen cup 224 is mounted directly below yolk cup 124 on the forward end of shaft 231 and is considerably larger than the yolk cup. The egg white being more fluid than the yolk disperses somewhat during its fall from half-cups 20 and thus requires a larger cup. Albumen cup 224 is shown hemispherical in shape but the shape is not critical. As seen in FIGURE 9, the rear end of shaft 231 telescopes into the forward end of an intermediate shaft 234 which extends completely through the breaking head. In the interest of clarity, shaft 234 and cooperating elements have been omitted from FIGURE 1 and shown in detail in FIGURES 9 and 12. Shaft 231 may be secured to shaft 234 by a set screw 235 as shown or by a quick-change coupling such as a bayonet coupling. A front collar 236 is mounted, as with set screws, on shaft 234 forward of wall 12; an intermediate collar 237 as mounted just behind wall 12; and a rear collar 239 is mounted rearwardly of wall 14.

As seen in FIGURES 9 and 12, intermeditae the ends of intermediate shaft 234 a vertical slot 260 extends through the shaft. A bore 261 in the rear portion of shaft 234 is coaxial with the slot 260. An albumen extension shaft 265 is slidable in bore 261 and projects rearwardly therefrom. A key 262 riding in slot 260 locks the forward end of albumen extension shaft 265 to sleeve 256. Shaft 265 is thereby movable longitudinally relative to shaft 234. The position of shaft 265 within shaft 234 is changed by axially moving collar 256 with a linkage to be described later. In FIGURE 10, shaft 255 and sleeve 256 are shown in a position forward of that shown in FIGURE 9. The rear end of shaft 265 terminates in albumen cam 266 which has operating surfaces 268 and 270 (FIGURE 2). As the breaking head 10 passes certain horizontal dogs projecting from stationary cam shaft 716, cam 266 will be rotated 90° in a direction depending on which of surfaces 268 or 270 engages a dog. The longitudinal position of shaft 265 within shaft 234 determines which dogs will activate cam 266. As viewed in FIGURE 2 surface 268 of cam 266 is in a position to be rotated by a dog. Rotation of shaft 265 causes rotation of 234 by virtue of the key 262 which locks the two shafts together. Shaft 231 and albumen cup 224 will thereby rotate and will either dump an egg white into a container or return to the up position after dumping depending on the position of breaking head 10 in the cycle.

Figure 7:
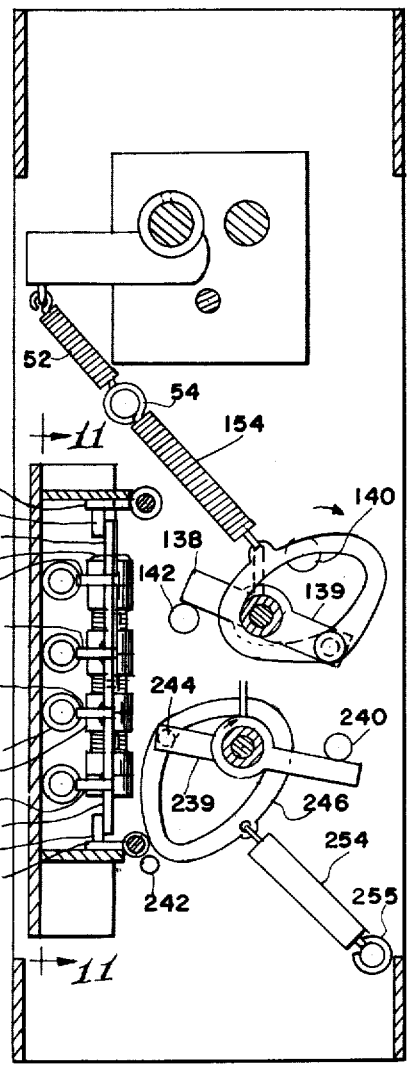
FIGURE 7 is an elevation section of the front half of the breaking head taken on the line 7—7 of FIGURE 1.

A spring-biased lever and cam linkage is attached to intermediate shaft 234 to give positive and rapid rotation of the shaft once rotation has been initiated by the interaction of cam 266 with a dog on the stationary cam shaft. As seen in FIGURE 7 two lateral opposed wings 238 and 239 are attached to the intermediate shaft 234 near front plate 12. The arc through which shaft 234 can rotate is determined by movement of wing 238 between upper stop 240 and lower stop 242 which project rearwardly from front plate 12. The outer end of wing 239 is pivoted by a pin 244 to an elliptical ring cam 246 through which shaft 234 passes. A spiral spring 254 under tension is attached at one end to the ring cam 246 opposite the pin 244 and at the other end to a peg 255 on front plate 12. When albumen cup 224 is in the up position, the ring cam 246 and shaft 234 are in contact with each other as seen in FIGURE 7. Wing 238 is also in contact with stop 240 and is held in this position by the tension of spring 254 acting through the linkage formed by ring cam 246 and wing 239. When shaft 234 begins to rotate against the tension of spring 254 as a result of interaction between cam 266 and a dog on the stationary cam shaft 716, wing 239 on shaft 234 changes the position of ring cam 246 relative to shaft 234. As shaft 234 rotates through about one-half of its arc, the pivot point of wing 239 on the cam moves from one side of shaft 234 to the other. As a result of this movement, spring 254 acts to continue the rotation and rapidly completes the movement of wing 238 to engagement with stop 242. The same rapid snap-action of shaft 234 returns wing 238 to engagement with stop 240 when cam 266 is actuated in the opposite direction.

*Dump Selector Means (FIGURES 1, 3, 6, 7, 9, 10 and 12)*

The dump selector means permits the operator of the apparatus to adjust the longitudinal position of yolk cam 166 and albumen cam 266 so that these cams are actuated at any of several preselected times in the cycle. As seen in FIGURE 1 manually operated push buttons I, II, III and IV are mounted on respective shafts which pass through front plate 12 of the breaking head. Buttons I and II control the longitudinal position of yolk extension shaft 165 and buttons III and IV control the longitudinal position of albumen extension shaft 265.

Button III and its dump-selecting linkage are shown in detail in FIGURES 9, 10 and 12. The dump-selecting linkages are located within a cage having front wall 174, side wall 176 and rear wall 178. Button III is attached to the forward end of a button shaft 283 which is spring biased in the forward position by a spiral spring 386 which is under compression between collar 384 and rear wall 178. Button shaft 382 passes through a hole in rear wall 178 and terminates in a flange 390. A center-pivoted horizontal lever 392 is supported by a bracket 396 and a pivot pin 392. The left end of lever 392 engages flange 390 and the right end engages to the top of flange 258 on slide collar 256. When button III is pressed rearwardly by an operator, lever 392 moves slide collar 256 and key-connected albumen extension shaft 265 forward. FIGURE 10 shows button III in its rearward position. Slide collar 256 is spring biased in a rearward direction by a return lever 397 one end of which engages flange 258 on the side opposite the engagement of lever 392. The other end of return lever 397 is pivoted by a pin 398 to a bracket 202 on rear plate 14. A spiral spring 399 in tension has one end attached to bracket 202 and the other end attached to return lever 397 at a point intermediate its ends.

Figure 6:
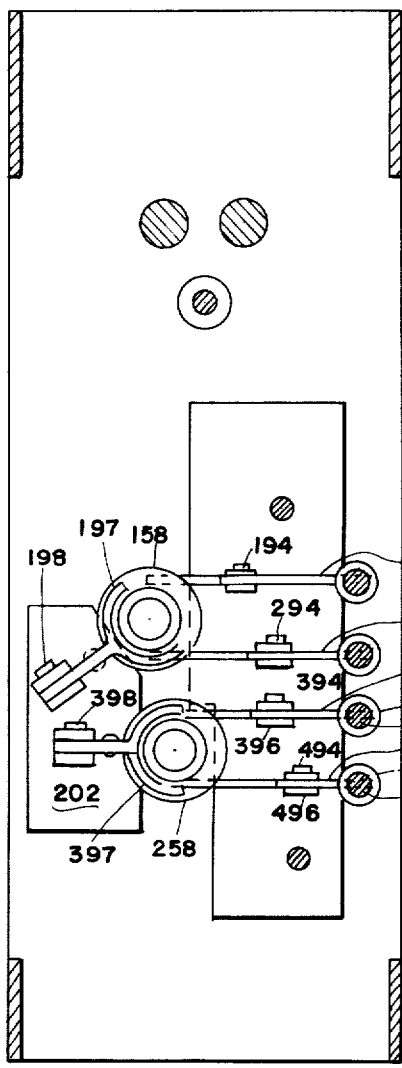
FIGURE 6 is an elevation section of the rear half of the breaking head taken on the line 6—6 of FIGURE 1.

The above description of the linkages associated with button III is applicable to the linkages associated with button IV. The linkage between button IV and albumen cam shaft 265 is located immediately below the button III linkage and consists of elements 482–496 which are substantial duplicates of elements 382–396, respectively. Center-pivoted horizontal lever 492 and its pivot pin 494 are slightly offset from lever 392 and its pivot pin 394 as seen in FIGURES 6 and 10. Lever 492 being below lever 392 engages the bottom of flange 258 on slide collar 256. The pressing of button IV to a full rearward position latches albumen extension shaft 265 in a position forward of the position resulting from the pressing of button III.

The above description of buttons III and IV is applicable to buttons I and II respectively. Elements 182–196 associated with button I are substantial duplicates of elements 382–396, elements 282–296 associated with button II are substantial duplicates of elements 482–496 and elements 197–199 associated with collar 156 are substantial duplicates of elements 397–399 associated with collar 256.

*Push Button Latch Means (FIGURES 1, 6, 7, 9, 10 and 11)*

In the drawings with the exception of FIGURE 10, albumen extension shaft 265 is shown biased in its rearward position. In order to hold button III and its above described linkage in a position which maintains albumen extension shaft 265 in a forward position against the tension of spring 204, a latch mechanism for collar 384 is provided.

A vertical latch support plate 628 (FIGURES 9 and 11) is attached as by welding to front wall 174 of cage 172. A rotatable plate 620 is hinged to plate 628 by means of hinge 622 and hinge pin 624. A spiral spring 626 which passes around hinge 622 has one end engaging support plate 628 and the other end engaging rotatable plate 620 so that rotatable plate 620 is biased in a clockwise direction as viewed in FIGURES 9 and 10. Rotatable plate 620 is held by spring 626 in contact with a movable release lever 612 to be presently described. On the outer side of rotatable plate 620 and adjacent the rear edge thereof, a horizontal generally triangular latch piece 630 is attached as by welding. The forward edge 632 of latch piece 630 acts as a cam surface for engagement with collar 384 on button shaft 382 when button III is pressed rearwardly. Continued movement of collar 384 when in engagement with edge 632 of latch piece 308 rotates rotatable plate 620 counter-clockwise as viewed in FIGURES 9 and 10. When collar 384 moves rearwardly far enough to become disengaged from latch piece 630, spring 626 returns rotatable plate 620 to its former position so that the rear edge 634 of latch piece 630 will engage the forward surface of collar 384 and will prevent forward movement of button rod 382. The albumen extension shaft 265 having been moved forward by the dump selector means described above is thereby latched in a forward position. FIGURE 10 shows shaft 265, button III and all interconnected elements in the latched position.

The means for latching push button IV consists of a latch piece 631 identical with latch piece 630 and attached to rotatable plate 620 below latch piece 630. When button IV is pressed to a full rearward position, collar 484 on button shaft 482 pushes aside surface 633 of latch piece 631 and becomes latched by rear surface 635 of latch piece 631.

The latch mechanism for buttons I and II, which consists of elements 520–536, is analogous to elements 620–636 for buttons III and IV. A rotatable vertical plate 520 carries spaced latch pieces 530 and 531 which latch buttons I and II in the same manner that latch pieces 630 and 631 latch buttons III and IV. When button I is pressed fully to the rear, collar 184 becomes latched behind latch piece 530 and yolk extension shaft 165 is held in a first forward position. When button II is pressed fully to the rear, collar 284 becomes latched behind latch piece 531 and yolk extension shaft 165 is held in a second forward position.

*Reset Means (FIGURES 1, 2, 6, 7, 9, 10 and 11)*

As has been indicated earlier, the dump selector means is provided with two reset features for cancelling the effect of previously pressed buttons. One reset feature is inherent in the disclosed construction of the operator-controlled push button latch means and permits the operator to cancel the effect of any button previously pressed during a cycle. The other reset feature consists of a linkage which is actuated by stationary cam shaft 716 and which cancels, before the beginning of a new cycle, the effect of any button pressed during the old cycle.

The operator-controlled reset feature resides in the co-operation of the collars on the push-button shafts with their respective latch pieces and rotatable plates. Referring to FIGURE 9 it is seen that both collar 384 on button shaft 382 and collar 484 on button shaft 482 are in the unlatched position. If either of buttons III or IV is pressed fully to the rear, the collar on that button shaft will become latched in its rearward position behind its respective latch piece, 630 or 631 as shown in FIGURE 10. If the other of buttons III or IV is then pressed fully to the rear, the previously latched collar will be reset to its unlatched position by spring 386 or 486, and the last-pressed button will become latched. This sequence is effected because both latch pieces 630 and 631 are rigidly attached to rotatable plate 620 with the result that movement of either latch piece results in movement of the other. For example, if collar 384 has been latched behind surface 634 of latch piece 630, it will be released by latch 630 and reset by spring 386 to its unlatched position when collar 484 moves latch piece 631 and consequently rotatable plate 620 and latch piece 630. It will be understood that there is a distinct difference between the position at which collar 384 unlatches collar 484 and the position at which collar 384 becomes latched. Collar 384 will become unlatched when collar 484 has rotated plate 620 a maximum in a counter-clockwise direction as viewed in FIGURE 3 but collar 484 will not become latched until it has moved rearwardly far enough to permit plate 620 to move slightly clockwise into a latching position. Thus, there is no possibility of both of collars 384 and 484 becoming latched at the same time. This construction also permits the operator to cancel the effect of a first-pressed button without effecting the latching of the second-pressed button. As indicated above, a full rearward stroke of a button is necessary to latch it in position, but less than a full rearward stroke will unlatch a previously latched button. Therefore, if the operator has latched button III in its rearward position and later desires that neither button III nor button IV should be latched, he may reset button III to a forward position by pressing button IV less than a full stroke. In practice a quick, jabbing motion of the operator's hand against button IV will force collar 484 sharply against latch piece 631 so that plate 620 will be thrown counter-clockwise as viewed in FIGURES 9 and 10 far enough to release collar 384.

Figure 11:
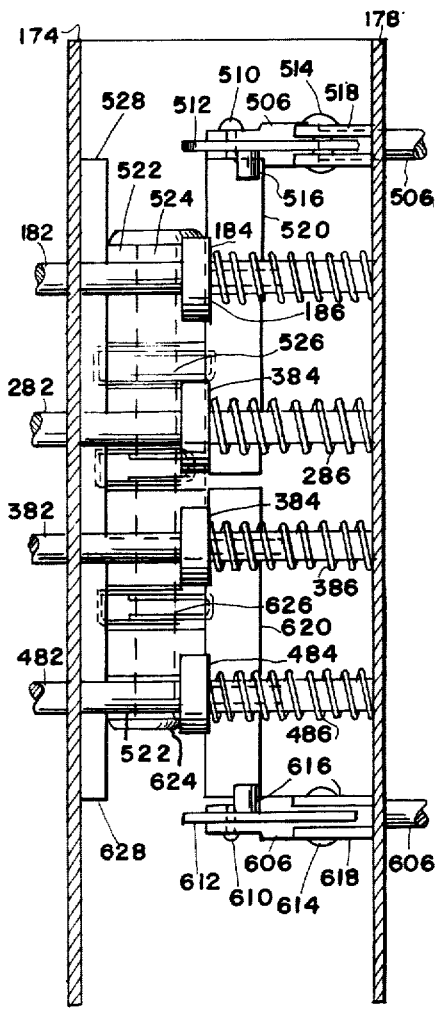
FIGURE 11 is an enlarged elevation taken on the line 11—11 of FIGURE 7.

The second reset feature for buttons III and IV is actuated by stationary cam shaft 716. An L-shaped lower reset lever 600 is pivoted by a pin 604 to a bracket 602 mounted on rear plate 14. A rod 606 which passes through rear plate 14 and rear cage plate 178 is pinned at its rear end to the forward end of lower reset lever 600 by a pin 608. A spring 609 biases rod 606 in a forward direction. At its forward end, rod 606 is pinned to one end of a release lever 612. The other end of release lever 612 is pivoted by a pin 614 to a support bracket 618 on rear cage wall 178. As seen in FIGURE 11, rod 606 and release lever 612 are located near the lower end of rotatable plate 620. Near the center of release lever 612 and on the upper surface thereof, a fixed pin 616 is attached. This pin 616 engages the outer lower surface of rotatable plate 620 and causes plate 620 to rotate slightly counter-clockwise in FIGURES 9 and 10 when rod 606 is moved rearwardly by cam-actuated lower reset lever 600. Thus, when lower reset lever 600 is rotated slightly counterclockwise as viewed in FIGURES 9 and 10 by a dog on stationary cam shaft 716, either of collars 384 or 484 which were latched by rotatable plate 620 will be released and reset to the forward position.

The reset features for buttons I and II are substantial duplicates of those just described with respect to buttons III and IV. Elements 500–536 are analogous to elements 600–636 which have been described above and cooperate with collars 184 and 284 in the same manner that elements 600–636 cooperate with collars 384 and 484. As is apparent from FIGURES 1, 2 and 11, upper reset lever 500 and its associated release lever 512 are mounted above the push button linkages. Pin 516 on release lever 512 therefore engages upper rotatable plate 520 near the top as seen in FIGURE 5.

*Stationary Cam Shaft and Table (FIGURES 17 and 18)*

Figure 17:
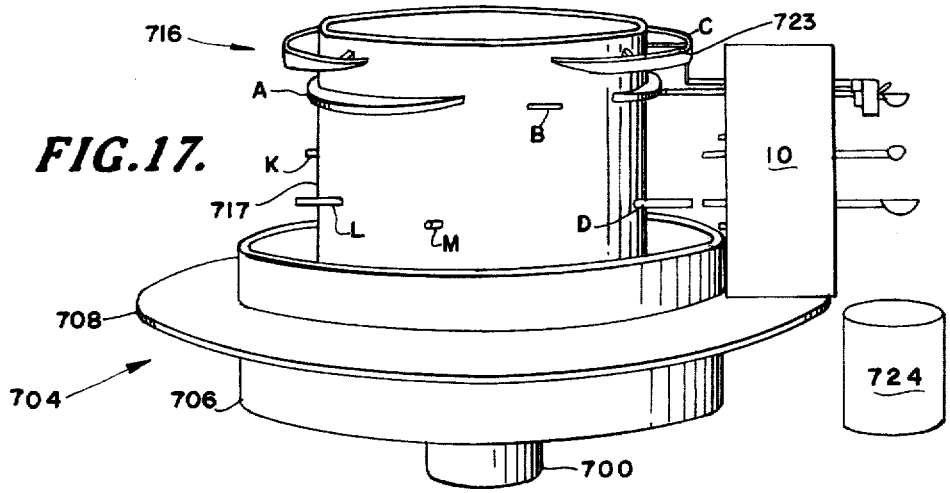
FIGURE 17 is a schematic elevation of the table and cam shaft which actuate the elements of the breaking head of FIGURE 1.
Figure 18:
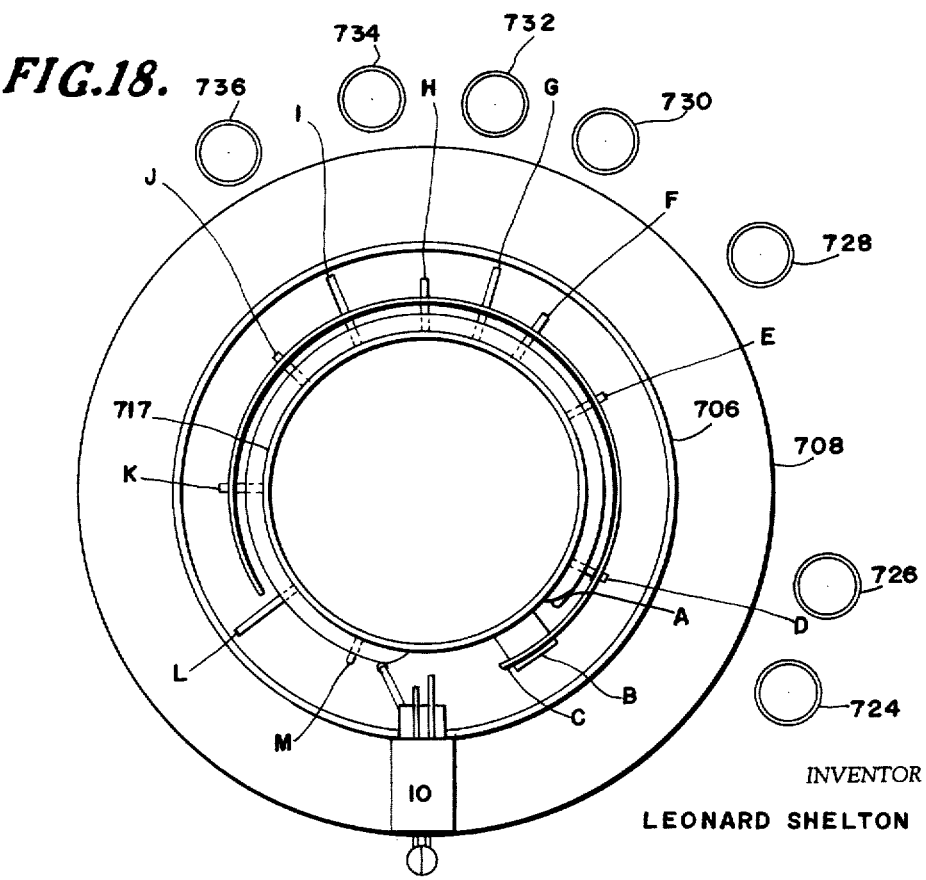
FIGURE 18 is a schematic plan view of the table and cam shaft of FIGURE 17.

The stationary cam shaft 716 and outer rotatable table 704 on which the breaking head 10 rides are shown schematically in FIGURES 17 and 18. A base 700 which is supported by any suitable means (not shown) supports the table 704 and stationary cam shaft 716. The table 704 is suitably journaled on base 700 for rotation about its own axis. Motor and gearing (not shown) is suitably connected with table 704 to rotate it at a predetermined speed around cam shaft 716. The precise manner in which base 700, table 704, and cam shaft 716 are interconnected forms no part of this invention and is therefore not shown in detail.

Table 704 consists of a vertical hollow cylindrical body 706 and a horizontal outer flange 708. Breaking head 10 rests on the upper surface of flange 708 and is attached along the lower portion of its rear plate 14 to the body 706 of the table. In practice table 704 will be of sufficient size to allow for attachment of 36 breaking heads 10 around its circumference. In order to simplify the drawings only one breaking head 10 has been shown.

Stationary cam shaft 716 is coaxial with table 704 and consists of a hollow cylindrical body 717 and various exterior cams and dogs to be next described. Cam A is a horizontal flange which projects from the body 717 of cam shaft 716 for engagement on its outer peripheral surface with the rollered end of cock lever 92 actuation of which cocks the knife 100 and drops the halves of the egg shell into a container 724. In order that the movement of cock lever 92 in both directions (and therefore the movement of egg-holding fingers 56) occur smoothly, the outer surface of a cam A slopes gradually in to the surface of body 717 at each end of the cam. This is particularly desirable at the end of the cam which releases cock lever 92 because this action permits fingers 56 to close smoothly and gently on an egg held in half-cups 20. Dog B is a horizontal metal plate projecting from body 717 for tripping crack lever 86 thus actuating the knife 100. Cam C is a rigid metal strip spaced from body 717 by a plurality of rigid horizontal support bars 720. The lower edge of cam C engages cam 46 on left shaft 38 so as to rotate shafts 36 and 38 and empty the contents of the cracked egg into yolk cup 124 and albumen cup 224.

Dogs D through M are horizontal bars projecting from body 717. One of dogs E, F and G will engage and rotate cam 166 90° to dump the yolk into one of containers 728, 730 or 732. Dogs E, F and G are of increasing length so that the particular one which engages cam 166 will depend on the horizontal position of cam 166 as determined by buttons I and II. Similarly dogs D, H and I are of increasing length, and one of these will engage cam 266 as determined by buttons III and IV to dump the white into one of containers 726, 734 and 736. Dogs K and L engage cams 166 and 266 respectively after the yolk and white have been dumped and returned the yolk cup 124 and albumen cup 224 to the up position. Near the end of the cycle, dogs J and M engage upper and lower reset levers 500 and 600 respectively to reset buttons I through IV.

*The Operation of the Invention*

The following sequence of steps occurs during one revolution of an egg breaking head 10 around the stationary camshaft 714. In parentheses following the statement of each step is a brief statement of the interaction of the opposed cam surfaces on the cam shaft 716 and on the head 10 which produces the action.

(1) An egg is inserted manually or by a conveyor into the cavity formed by the two half-cups 20. (At this time fingers 56 are up and the knife 100 is in a cocked position.)

(2) Fingers 56 lower into engagement with top of egg. (Cam A releases spring biased cock lever 92.) (See also FIGURE 14.)

(3) Knife 100 cracks egg. (Dog B trips crack lever 86.) (See also FIGURE 15.)

(4) Half-cups 20, associated fingers 56 and half blades 102 separate by rotating 90° in opposite directions and remain separated.

(a) One half of egg shell remains grasped between a half-cup 20 and a finger 56.

(b) Yolk and white drop as half-cups 20 separate; yolk drops into yolk cup 124, white drops past yolk cup into albumen cup 224.

(Cam C rotates spring biased half-cup shaft 38 90° and holds it in this position.) (See also FIGURE 16.)

(5) Operator observes condition of yolk and white and presses one of the four push buttons if he desire to dump either the yolk or white separately from predumped perfect yolks and perfect whites. If the yolk and white of the new cracked egg are perfect and have separated perfectly, no button is pressed and the yolk and white will be later dumped into separate containers which already hold previously dumped perfect yolks and whites.

(a) If the yolk is off-color, the operator presses button I a full stroke to the rear so that the yolk cup 124 will later dump the off-color yolk separately from the perfect yolks. (Push button linkage horizontally moves the cammed extension 165 on the yolk cup shaft away from stationary cam 716.)

(b) If the yolk is inedible, the operator presses button II so that the yolk cup 124 will later dump the inedible yolk separately from both the perfect and off-color yolks. (Push button linkage moves the cammed extension 165 on the yolk cup shaft further away from stationary cam shaft 716 than when button I is pressed.) If either button I or II is pressed less than a full stroke as, for example, with a quick jabbing motion, the reset feature in the push button linkage will release whichever of button I or II has been pressed and thus resets the cammed extension 165 on the yolk cup shaft to the position at which the cup is dumped when no button has been pressed. In addition, if either button I or II has been pressed and the other is then pressed with a full stroke, the reset feature will release the first-pressed button and the continued movement of the second-pressed button will effect the function of that button.

(c) If the white is mixed with yolk, the operator presses button III so that the albumen cup 224 will later dump the mixed egg separately from perfect whites. (Push button linkage horizontally moves the cammed extension 265 on the end of the albumen cup shaft away from the stationary cam shaft 716.)

(d) If the white is inedible, the operator presses button IV so that the white cup shaft will later dump the inedible white separately from both the perfect white and the mixed egg. (Push button linkage moves cammed extension 265 on the white cup shaft further away from cam shaft 716 than when button III is pressed. The reset feature of the linkage is the same as described above with respect to buttons I and II.)

(6) Fingers 56 move away from associated half-cups 20 to drop halves of egg shell; fingers 56 continue to move away from half-cups 20 to engage part 114 of knife linkage and thereby cock the knife. (Cam A engages and holds cock lever 92 until step 2 of the next cycle.)

(7) Albumen cup 224 rotates 90° to dump perfect whites if neither button III or IV has been pressed. (Dog D rotates 90° the cammed extension 265 on albumen cup shaft.)

(8) Yolk cup 124 rotates 90° to dump perfect yolks if neither button 1 or II has been pressed. (Dog E rotates 90° the cammed extension 165 on yolk cup shaft.)

(9) Yolk cup 124 rotates 90° to dump off-color yolk if button I has been pressed. (Dog F rotates 90° the cammed extension 165 on yolk cup shaft.)

(10) Yolk cup 124 rotates 90° to dump inedible yolk if button II has been pressed. (Dog G rotates 90° the cammed extension 165 on yolk cup shaft.)

(11) Albumen cup 224 rotates 90° to dump mixed egg if button III has been pressed. (Dog H rotates 90° the cammed extension 265 on albumen cup shaft.)

(12) Albumen cup 224 rotates 90° to dump inedible white if button IV has been pressed. (Dog I rotates 90° the cammed extension 265 on albumen cup shaft.)

(13) Buttons I and II reset to "perfect egg" position. (Dog J trips upper reset lever 500.)

(14) Yolk cup 124 returns to up position. (Dog K rotates 90° the cammed extension 165 on yolk cup shaft in a direction opposite to the previous rotation.)

(15) Half-cups 20 with associated fingers and half-blades return to closed position with fingers in up position. (Cam C releases half-cup shaft 38 which then rotates 90° under action of spring 52; cam A continues to engage and hold cock lever 92.)

(16) Albumen cup 224 returns to up position. (Dog L rotates 90° the cammed extension 265 on albumen cup shaft in a direction opposite to the previous rotation.)

(17) Buttons III and IV reset to "perfect egg" position. (Dog M trips lower reset lever 600.)

The breaking head 10 is now ready to receive another egg as step 1 of the next cycle.

The disclosed sequence of dumping yolks and whites and returning the cups 124 and 224 to an upright position is not critical and has been given only to illustrate one manner of operating a breaking head 10. The breaking head can easily be modified to dump whole eggs by removing the yolk cup 124 so that yolk and white will drop together into cup 224. Various blends of yolks and whites can be obtained by operating the modified head on the same rotatable table with heads which separately dump yolks and whites.

While a complete embodiment of the invention has been shown and described, it is to be understood that the invention is not limited to the details of construction disclosed by way of illustration, as these may be changed and modified in form and arrangement by those skilled in the art without departing from the scope of the invention which is limited only by the appended claims.

What is claimed is:

1. An egg breaking machine comprising; two slightly spaced adjacent half-cups having their concave surfaces facing each other and upwardly so as to form a cavity for receiving an egg; separate support means for each half-cup; a finger means associated with each of said half-cups, each finger means being pivoted at one end on the same support means which supports the associated half-cup and having a free end movable between a position adjacent the top of the cavity of its associated half-cup and a position above the top of the associated half-cup to clamp an egg into position in said half-cups; and a knife means having a cutting portion pivoted at one end on one of said support means and movable between a position below said half-cups and a position between the lower edges of the spaced adjacent half-cups to cut open an egg disposed therein.

2. Egg breaking machine as in claim 1 further comprising; means for moving said separate support means in opposite directions so that each of said half cups and associated finger means moves away from the other half-up and associated finger means.

3. Egg breaking machine as in claim 1 in which said knife means comprises two adjacent parallel half-blades, each half-blade being pivoted on a different one of said separate support means.

4. Egg breaking machine as in claim in which each of said half-cups comprises; a front wall; a side wall; a bottom wall and a rear wall adjacent said support means; said front wall, side wall and bottom wall being concave inwardly and said rear wall being substantially flat.

5. Egg breaking machine as in claim 4 in which the inner surface of said rear wall meets the inner surface of said bottom wall at an angle of about 122°.

6. An egg breaking assembly comprising a cup means for holding an egg in a position to be cut having concave side, front, and bottom wall portions and a forwardly extending substantially flat rear wall, resiliently biased fingers adapted to engage said egg and hold it in clamping position against at least the bottom wall of said cup means, and a cutting means disposed adjacent said bottom wall and adapted to engage the portion of the egg disposed thereagainst to crack the egg shell.

7. An egg holding, clamping, and cutting assembly including cup means comprising laterally spaced complementary cup halves, means for clamping an egg in position in said cup halves including resiliently loaded fingers adapted to engage said egg, and knife means located between said cup halves and movable relative thereto to cut the shell of the egg disposed in said cup means.

8. An egg breaking assembly comprising an egg cup, clamping means for retaining an egg in said egg cup, means for resiliently biasing said clamping means into engagement with said egg, a knife for cutting the shell of the egg in said egg cup, means for biasing the knife into cutting engagement with said egg, means for latching said knife out of the egg cutting position, means for tripping said latching means to permit the knife to cut said egg, and means for retracting said clamping means and for resetting said knife means after the egg has been cut and the contents emptied therefrom to permit the release of the empty egg shell.

9. An egg breaking assembly comprising an egg holder made up of two laterally spaced cup halves, clamping means for holding an egg in position in said cup halves including at least one finger adapted to engage the upper surface of the egg, means for resiliently biasing the clamping means into engagement with the egg, cutting means for cutting the shell of the egg in said egg holder comprising knife halves normally disposed beneath the space between the spaced cup halves, means for moving the knife means into a latching position, means for latching the knife out of the shell cutting position, and means adapted to be moved in one direction to engage said latching means to trip the knife means and to be moved in the opposite direction to retract said clamping means, move the knife into a latching position, and latch said knife to permit the release of the egg shell sections from the egg cup halves.

References Cited in the file of this patent
UNITED STATES PATENTS

| | | |
|---|---|---|
| 498,488 | Power | May 30, 1893 |
| 1,496,312 | Harkin | June 3, 1924 |
| 2,523,301 | Hodson et al. | Sept. 26, 1950 |
| 2,536,057 | Hodson et al. | Jan. 2, 1951 |
| 2,649,186 | Powell | Aug. 18, 1953 |
| 2,723,695 | Willsey | Nov. 15, 1955 |
| 2,771,926 | Willsey | Nov. 27, 1956 |
| 2,815,055 | Willsey | Dec. 3, 1957 |

UNITED STATES PATENT OFFICE
CERTIFICATE OF CORRECTION

Patent No. 3,082,804                          March 26, 1963

Leonard Shelton

It is hereby certified that error appears in the above numbered patent requiring correction and that the said Letters Patent should read as corrected below.

Column 5, line 3, after "8 in" insert -- an uncocked or egg-breaking position and in FIGURE 3 in --; column 6, line 42, for "intermeditae" read -- intermediate --; column 12, line 74, for "half-up" read -- half-cup --; column 13, line 4, after "claim" insert -- 1 --.

Signed and sealed this 8th day of October 1963.

(SEAL)
Attest:

ERNEST W. SWIDER
Attesting Officer

EDWIN L. REYNOLDS

Acting Commissioner of Patents